US008602065B2

(12) United States Patent
Aulanko et al.

(10) Patent No.: US 8,602,065 B2
(45) Date of Patent: Dec. 10, 2013

(54) ANTICIPATORY FAILURE INDICATOR AND FLUID COOLING ARRANGEMENT

(75) Inventors: Mikael Aulanko, Helsinki (FI); Risto Laurila, Helsinki (FI); Heikki Elomaa, Helsinki (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 13/426,267

(22) Filed: Mar. 21, 2012

(65) Prior Publication Data

US 2013/0248139 A1    Sep. 26, 2013

(30) Foreign Application Priority Data

Mar. 28, 2011   (EP) ...................................... 11159801

(51) Int. Cl.
*F16L 55/00*    (2006.01)

(52) U.S. Cl.
USPC ................ 138/104; 138/36; 73/709; 116/266

(58) Field of Classification Search
USPC .................... 138/36, 104; 116/206, 273, 274; 73/783, 709
See application file for complete search history.

(56) References Cited

U.S. PATENT DOCUMENTS

| 2,827,008 | A | * | 3/1958 | Hodge | 116/273 |
| 3,911,959 | A | * | 10/1975 | Frank | 138/36 |
| 3,922,999 | A | * | 12/1975 | Meginnis | 116/208 |
| 4,735,083 | A | * | 4/1988 | Tenenbaum | 73/40.5 R |
| 5,127,433 | A |  | 7/1992 | Argyle et al. |  |
| 5,181,536 | A | * | 1/1993 | Argyle et al. | 137/559 |
| 5,228,478 | A |  | 7/1993 | Kleisle |  |
| 5,731,523 | A | * | 3/1998 | Cusumano et al. | 73/783 |
| 2005/0062487 | A1 |  | 3/2005 | Strackbein et al. |  |

FOREIGN PATENT DOCUMENTS

| DE | 39 08 671 A1 | 9/1990 |
| DE | 42 37 477 A1 | 5/1994 |
| JP | 55-11544 U | 7/1978 |
| JP | 61-224839 A | 10/1986 |
| JP | 2010-14448 A | 1/2010 |
| WO | WO 90/08915 A1 | 8/1990 |

OTHER PUBLICATIONS

The extended European Search Report dated Jul. 25, 2011, issued in corresponding European Patent Application No. 11159801.7. (6 pages).
English translated Japanese Office Action issued on Jul. 2, 2013 by the Japan Patent Office in corresponding Japanese Patent Application No. 2012-067236.

* cited by examiner

*Primary Examiner* — Patrick F Brinson
(74) *Attorney, Agent, or Firm* — Buchanan Ingersoll & Rooney PC

(57) ABSTRACT

A simple and reliable anticipatory failure indicator is provided for fluid circulation piping, and a fluid cooling arrangement including such an indicator is provided. The indicator includes a first sacrificial member, which is designed to be in direct contact with the fluid within the piping and designed to be weaker than the piping. The indicator includes a chamber, which is isolated from the fluid circulation at least partly by means of the first sacrificial member. The indicator includes an electrical response member, which is arranged into the chamber and which is configured to produce an electrical response upon exposure to the fluid, which has entered to the chamber via a failed sacrificial member. Accordingly, the indicator is configured to provide an electrical response as a direct indication of a failed sacrificial member and as an anticipatory indication of failed piping.

20 Claims, 2 Drawing Sheets

US 8,602,065 B2

ANTICIPATORY FAILURE INDICATOR AND FLUID COOLING ARRANGEMENT

RELATED APPLICATION

This application claims priority under 35 U.S.C. §119 to European Patent Application No. 11159801.7 filed in Europe on Mar. 25, 2012, the entire content of which is hereby incorporated by reference in its entirety.

FIELD

The present disclosure relates to anticipating failures in fluid circulation piping. More particularly, the present disclosure relates to an anticipatory failure indicator for fluid circulation piping, and to a fluid cooling arrangement including such an anticipatory failure indicator.

BACKGROUND INFORMATION

Fluid circulation is a common and efficient way of cooling machines and processes. Fluid coolant is circulated in fluid connection with a heat source, whereby heat is conducted away from the source by virtue of the heat conductive properties of the coolant fluid. A typical cooling application of fluid circulation is the cooling of motors, wherein conventional circulation systems are adequate.

However, it is more and more frequently the case that cooling circulation is desired for applications that reside in remote and demanding locations. One example of such an application is wind turbines. In addition to electricity, wind turbines generate a considerable amount of waste heat, which require efficient cooling. As wind turbines are generally located in remote locations and high above ground level, the maintenance of the cooling system is challenging.

Conventional fluid circulation cooling systems are, however, quite vulnerable malfunctions. Conventional systems may fail due to the effect of the cooling liquid being in contact with the piping and seals of the system. The cooling liquid can particularly cause corrosion, erosion in sections of the circulation having high flow or concentration in sections of the circulation having slow flow. If the cooling circulation system of the frequency converter of a wind turbine, for example, were to fail, also the frequency converted would fail and the process would seize. As wind turbines are difficult to reach, the failure would lead to a significant downtime and loss of profits.

Solutions have been created for noticing a failure in such cooling systems. However, as explained above, it would be desirable to anticipate probable failures such that the remote location is reached in time. In order to anticipate such failures and appropriate maintenance actions, special analysis systems have been created. These known analysis systems measure the corrosion rate of sacrificial sensor material and based on the corrosion rate, the system derives the probable failure time for the specific circulation piping. Such analysis systems are, however, rather complicated, expensive and require considerable adaptation efforts. In addition, the output represents a mere mathematical assessment of the probable failure. As a result, such systems are not ideal for applications in remote and demanding locations, such as in cooling the frequency converter of a wind turbine.

SUMMARY

An exemplary embodiment of the present disclosure provides an anticipatory failure indicator for fluid circulation piping. The exemplary indicator includes a first sacrificial member which is configured to be in direct contact with fluid within the piping and to be weaker than the piping. The exemplary indicator also includes a chamber which is isolated from the fluid circulation at least partly by means of the first sacrificial member. In addition, the exemplary indicator includes an electrical response member which is arranged into the chamber and which is configured to produce an electrical response upon exposure to the fluid, which has entered to the chamber via a failed sacrificial member. The indicator is configured to provide an electrical response as a direct indication of a failed sacrificial member and as an anticipatory indication of failed piping.

An exemplary embodiment of the present disclosure provides a fluid cooling arrangement which includes a piping for circulating fluid coolant and having a resistance against strain caused by the circulated fluid coolant. In addition, the exemplary fluid cooling arrangement includes the above-described anticipatory failure indicator arranged in fluid connection with the piping for anticipating a failure caused by the circulated fluid coolant to the piping.

BRIEF DESCRIPTION OF DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a simple and reliable anticipatory failure indicator for fluid circulation piping.

In accordance with an exemplary embodiment of the present disclosure, an anticipatory failure indicator includes a first sacrificial member, which is configured to be in direct contact with the fluid within the piping and configured to be weaker than the piping. The exemplary indicator also includes a chamber, which is isolated from the fluid circulation at least partly by means of the first sacrificial member. In addition, the exemplary indicator includes an electrical response member, which is arranged into the chamber and which is configured to produce an electrical response upon exposure to the fluid, which has entered to the chamber via a failed sacrificial member. Accordingly, the indicator is configured to provide an electrical response as a direct indication of a failed sacrificial member and as an anticipatory indication of failed piping.

An exemplary embodiment of the present disclosure also provides a fluid cooling arrangement which includes a piping for circulating fluid coolant. The piping has a resistant against strain caused by the circulated fluid coolant. The exemplary arrangement also includes an anticipatory failure indicator according to the present disclosure.

Considerable benefits are gained with aid of the present disclosure.

Since the sacrificial member of the indicator is designed to be weaker than the piping, an indication is received before the piping experiences an actual leakage resulting in failure of the process. The indication is furthermore achieved in a very simple and therefore reliable manner. For example, a leak in a liquid cooling system for a frequency converter would cause a failure thereof and the device being controlled by the frequency converter. By virtue of the anticipatory failure indicator according to the present disclosure, it is possible to react in a preventive manner and to arrange maintenance before any possible damage occurs. This is especially advantageous in remote applications such as wind turbines, for which the expected life cycle is about 20 years. Exemplary embodiments of the present disclosure also enable reliable cooling in such demanding conditions.

Figure 1:
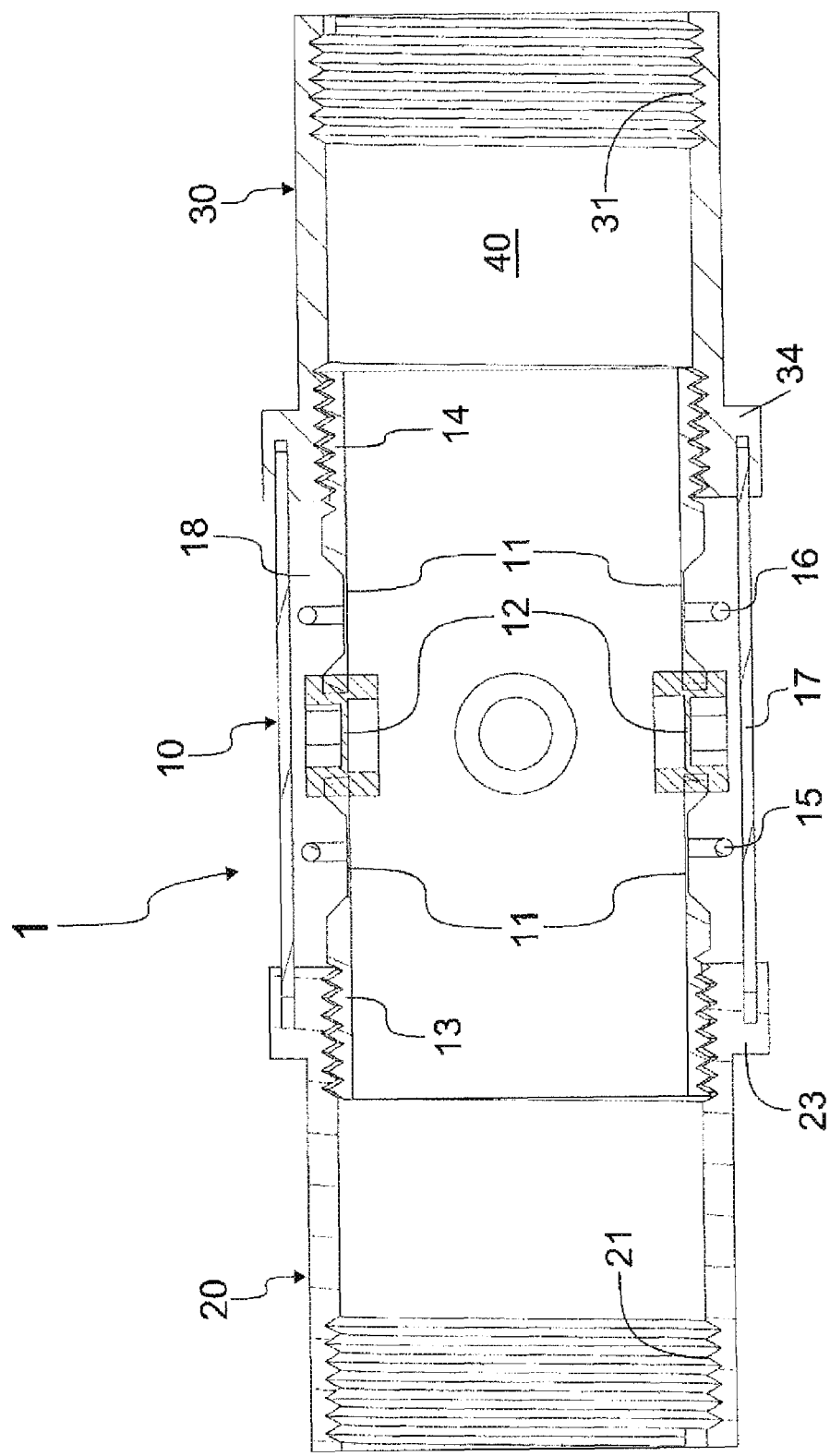
FIG. 1 presents a cross-sectional view of an anticipatory failure indicator according to an exemplary embodiment of the present disclosure.

As can be seen from FIG. 1, the anticipatory failure indicator 1 according to an exemplary embodiment of the present disclosure includes an indication body portion 10, which is arranged between two adaptors 20, 30 which are connectable to the circulation piping. The adaptors 20, 30 have application specific interfaces to both the piping and to the indication body portion 10. In the exemplary embodiment of FIG. 1, the interface between the adaptor 20, 30 and piping is a thread coupling, wherein an inner thread 21, 31 is designed to couple to the piping and may be of a standard size. Respectively, the interface between the adaptor 20, 30 and the indication body portion 10 is another inner thread 23, 34, wherein the indication body portion 10 includes a corresponding outer thread 13, 14. Alternatively, either or both of the interfaces may be provided with other kinds of shape locking means, such as suspended quick release couplings. Accordingly, the indication body portion 10 may be designed to indicate failure resulting from wear of a certain degree and to be independently coupled to the piping of any size by means of the adaptors 20, 30. Furthermore, a single type of indication body portion 10 may be applied to pipings of different sizes.

Figure 2:
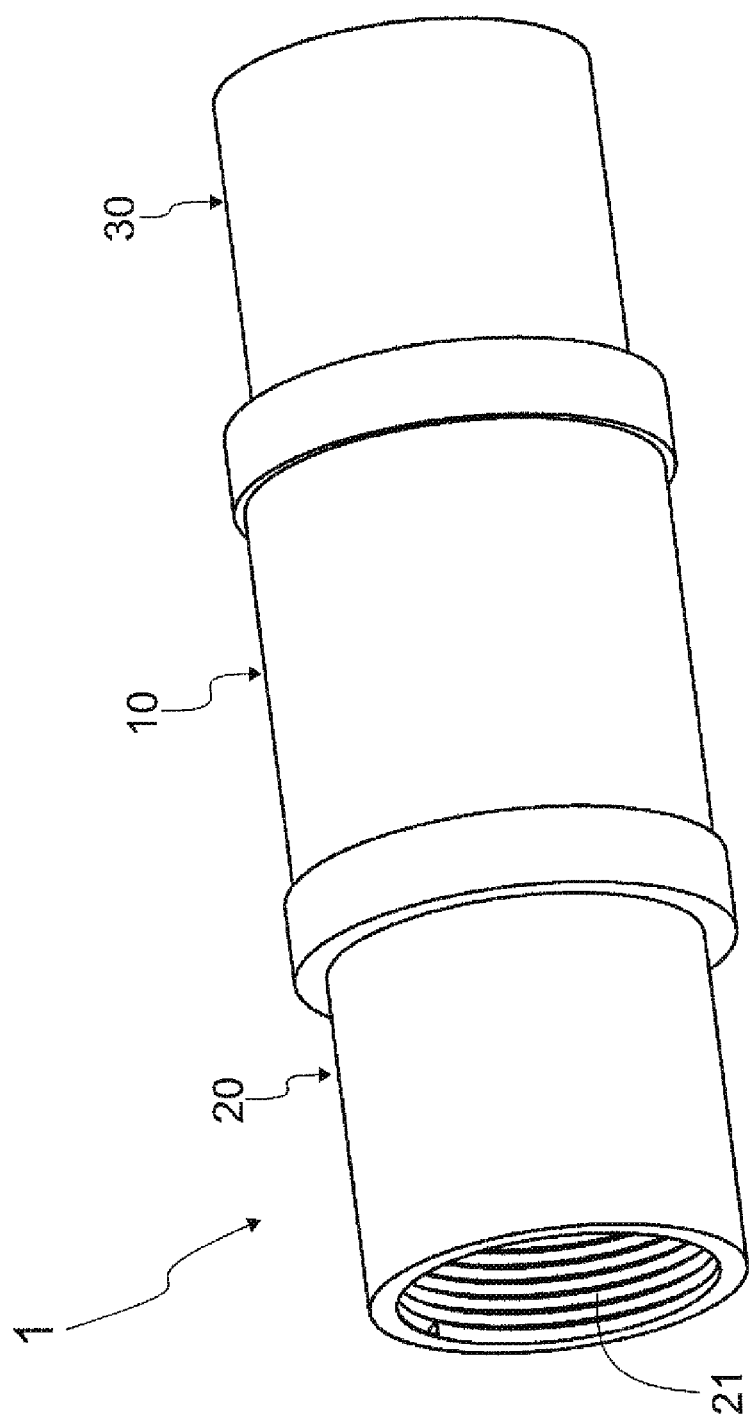
FIG. 2 presents an isometric elevation view of the indicator of FIG. 1, according to an exemplary embodiment of the present disclosure.

The indication body portion 10 of the anticipatory failure indicator 1 therefore contains the reactive elements of the indicator 1. The indication body portion 10 is a hollow piece which is designed to be connected in series with the piping as part of the circulation thereof (FIG. 2). The indication body portion 10 includes a first sacrificial member 11 which is configured to be in direct contact with the fluid 40 flowing from the piping to inside the indication body portion 10 via the adaptor 20, 30. The first sacrificial member 11 is designed to be weaker than the piping such that the sacrificial member 11 is configured to fail sooner than the piping under any strain caused by the circulated fluid. In other words, the sacrificial member 11 is designed to fail after less circulatory fluid induced strain than the piping. Dimensioning and design with respect to different failure types shall be described hereafter.

The indication body portion 10 also includes a chamber 18, which is isolated from the fluid circulation 40 at least partly by means of the first sacrificial member 11. The chamber 18 may be formed as an internal cavity within the indication body portion 10. Accordingly, the first sacrificial member 11 acts as a separating wall which keeps the circulation fluid 40 outside the chamber 18, for example, within the indication body portion 10. An electrical response member 15, 16, is arranged into the chamber 18. The electrical response member 15, 16 is configured to produce an electrical response upon exposure to the fluid 40, which has entered to the chamber 18 via a failed sacrificial member 11.

According to an exemplary embodiment, the electrical response member 15, 16 includes a first conductor 15 and a second conductor 16, which is arranged at a distance from the first conductor 15 within the chamber 18. The conductors 15, 16 are arranged such that when the fluid 40 has entered to the chamber, the fluid 40 provides a contact between the conductors 15, 16. The indicator 1 is configured to provide an electrical response as direct indication of a failed sacrificial member 11 and as an anticipatory indication of failed piping. The conductors 15, 16 are connectable to a control circuit through conduits (e.g., wiring, cabling, etc.). The control circuit is configured to produce an out signal representing the contact between the conductors 15, 16 as indication of a failed sacrificial member. Such a control circuit may be part of the indicator 1 or as an external device. The control circuit is configured to measure a property of the conductors 15, 16 such as resistance or voltage therebetween. As the chamber 18 is filled with fluid to the extent that the conductors 15, 16 are electrically connected by the fluid, the resistance between conductors 15, 16 reduces as indication that the sacrificial member 11 has failed.

According to an exemplary embodiment, the indicator 1 includes a transparent wall 17 for providing visual confirmation of the failed sacrificial member 11. The transparent wall 17 is arranged such that the content of the chamber 18 is visible to the outside of the indication body portion 10. The transparent wall 17 is therefore provided to the outside surface of the indication body portion 10, wherein the chamber 18 is partly defined by the transparent wall 17. By virtue of the wall 17, the failure of the sacrificial member 11 can be confirmed from the outside as the filled chamber 18 clearly visibly provides improved reliability in addition to the electrical response.

In accordance with an exemplary embodiment, the anticipatory failure indicator 1 according to the present disclosure may be designed to indicate one or more different failure modes. For example, the first sacrificial member 11 may be designed to represent the wall of the piping, wherein piping and the first sacrificial member 11 having substantially similar durability properties, and the wall thickness of the first sacrificial member 11 is smaller than that of the piping. As the first sacrificial member 11 and the piping have similar durability but the sacrificial member 11 is thinner, it is bound to fail earlier than the piping. Such an effect can be achieved by manufacturing the sacrificial member 11 and the piping from the same or substantially similar material. In order to achieve adequate margin between the failure of the sacrificial member 11 and the failure of the piping, the relative wall thickness between the piping and the sacrificial member 11 depends on the application in question. Generally, the wall thickness of the sacrificial member is about half or less of the corresponding piping wall thickness. Accordingly, the first sacrificial member 11 is a wall which is less resistant to stress caused by the fluid circulation 40 than the piping. Thus, the failure mode could be erosion, for example.

Alternatively or additionally, the anticipatory failure indicator 1 may include a second sacrificial member. The second sacrificial member may act as a verifying member when a second chamber is employed. Alternatively, the second sacrificial member may be designed to indicate another failure mode. According to an exemplary embodiment, the indicator 1 includes a second sacrificial member 12 which is also designed to be in direct contact with the fluid 40 within the piping and isolating the fluid 40 from the chamber 18 and to be weaker than the piping in respect to a second failure mode. According to an exemplary embodiment, the first sacrificial member 11 is designed to be weaker than the piping in respect to a first failure mode, which is different than the second failure mode. For example, the second sacrificial member 12 may be designed to be weaker than the seals used in the piping.

According to an exemplary embodiment, the indicator 1 includes a third sacrificial member 13, 14, which is designed to be in direct contact with the fluid 40 within the piping and which isolates the fluid 40 from the chamber 18. The third sacrificial member 13, 14 is further designed to be weaker than the piping in respect to a third failure mode, which is different than the first and second failure modes. In the example of FIG. 1, the third sacrificial member 13, 14 is a threaded coupling between the indication body portion 10 and the adaptor 20, 30 for simulating couplings between members of the piping. Accordingly, the couplings 13, 23; 14, 34 are designed to correspond to couplings commonly used in piping in which the indicator 1 is used. A weak point between the thread and gasket is thereby established.

As mentioned above, each of the sacrificial members may be designed to fail under different failure modes. The failure modes can be failure by erosion, which is caused by the abrasive effect of the viscous flow within the piping, failure by pressure shock, failure by corrosion, which is caused by concentration of circulatory fluid in sections of low flow. For example, the first failure mode may be erosion, the second pressure shock and the third corrosion, respectively. Other important failure modes include spot and crevice corrosion. In practice each or one sacrificial member may indicate failure by a combination of modes, for example erosion and pressure shock. The indicator 1 may also be installed in a section of the piping which is most probable to suffer from a specific failure mode. For example, an indicator 1 having a sacrificial member 11, which is designed to indicate erosion, is arranged in a section of the piping having the highest flow rate in the system. Accordingly, an indicator 1 having a sacrificial member 12, which is designed to indicate corrosion due to concentration, is arranged in a section of the piping having the lowest flow rate in the system.

An example of a circulatory fluid is a mixture of water, glycol and retarder. One particularly important failure mode is spot corrosion. Accordingly, the second sacrificial member 12 is—according to an exemplary embodiment—a fitting experiencing stagnant flow conditions and designed to fail under spot corrosion sooner than the piping.

While the present disclosure is applicable to a vast variety of applications, the indicator 1 is especially suitable for use in a cooling piping of a frequency converter of a wind turbine. Accordingly, the present disclosure also relates to a fluid cooling arrangement of a frequency converter. The arrangement includes a piping for circulating fluid coolant. The piping has a resistance against strain caused by the circulated fluid coolant. Failure modes of against strain caused by the circulated fluid coolant are described above. The arrangement further includes an anticipatory failure indicator 1 arranged in fluid connection with the piping for anticipating a failure caused by the circulated fluid coolant to the piping. The anticipatory failure indicator 1 can be constituted by any of the exemplary embodiments as described above. For example, the anticipatory failure indicator 1 includes a first sacrificial member 11, which is designed to be in direct contact with the fluid within the piping and designed to be weaker than the piping. The indicator also includes a chamber 18, which is isolated from the fluid circulation at least partly by means of the first sacrificial member. The indicator 1 also includes an electrical response member 15, 16, which is arranged into the chamber 18 and which is adapted to produce an electrical response upon exposure to the fluid 40, which has entered to the chamber 18 via a failed sacrificial member 11. Accordingly, the indicator 1 is configured to provide an electrical response as direct indication of a failed sacrificial member 11 and as an anticipatory indication of failed piping.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

TABLE 1

List of reference numbers.

| Number | Part |
| --- | --- |
| 1 | anticipatory failure indicator |
| 10 | indication body portion |
| 11 | first sacrificial member, e.g. wall |
| 12 | second sacrificial member, e.g. seal |
| 13 | third sacrificial member, e.g. thread |
| 14 | third sacrificial member, e.g. thread |
| 15 | first conductor |
| 16 | second conductor |
| 17 | transparent wall |
| 18 | chamber |
| 20 | adaptor |
| 21 | thread |
| 23 | thread |
| 30 | adaptor |
| 31 | thread |
| 34 | thread |
| 40 | fluid circulation |

What is claimed is:

1. An anticipatory failure indicator for fluid circulation piping, the indicator comprising:
    a first sacrificial member which is configured to be in direct contact with fluid within the piping and to be weaker than the piping;
    a chamber which is isolated from the fluid circulation at least partly by means of the first sacrificial member;
    an electrical response member which is arranged into the chamber and which is configured to produce an electrical response upon exposure to the fluid, which has entered to the chamber via a failed sacrificial member;
    an indication body portion housing the chamber;
    an electrical response member;
    the first sacrificial member;
    an interface for connecting to the piping; and
    an adaptor having a corresponding first interface for connection to the indication body portion and having a second interface for connecting to the piping,
    wherein the indicator is configured to provide an electrical response as a direct indication of a failed sacrificial member and as an anticipatory indication of failed piping.

2. The anticipatory failure indicator according to claim 1, wherein the electrical response member comprises a first conductor and a second conductor arranged at a distance from the first conductor within the chamber such that fluid entered into the chamber provides a contact between the conductors.

3. The anticipatory failure indicator according to claim 2, comprising:
    a circuit configured to measure an electrical property indicating the contact between the conductors,
    wherein the electrical response member is connectable to the circuit.

4. The anticipatory failure indicator according to claim 3, wherein the electrical property is at least one of a resistance and a voltage between the conductors.

5. The anticipatory failure indicator according to claim 1, wherein the chamber is further at least partly defined by a transparent wall configured to provide visual indication of a failure of the first sacrificial member from outside of the chamber.

6. The anticipatory failure indicator according to claim 1, wherein the first sacrificial member is constituted by a wall which is less resistant to stress caused by fluid circulation than the piping.

7. The anticipatory failure indicator according to claim 6, wherein a thickness of the wall of the first sacrificial member is smaller than a thickness of the piping and is constituted by a material having substantially similar durability properties as a material of the piping.

8. The anticipatory failure indicator according to claim 1, wherein the first sacrificial member is configured to be weaker than the piping in respect to a first failure mode, and
wherein the indicator comprises a second sacrificial member configured to be in direct contact with the fluid within the piping and isolating the fluid from the chamber, and to be weaker than the piping in respect to a second failure mode, which is different than the first failure mode.

9. The anticipatory failure indicator according to claim 8, wherein the second sacrificial member comprises a seal configured to be weaker than seals in the piping.

10. The anticipatory failure indicator according to claim 8, comprising:
a third sacrificial member configured to be in direct contact with the fluid within the piping and isolating the fluid from the chamber, and to be weaker than the piping in respect to a third failure mode, which is different than the first and second failure modes.

11. The anticipatory failure indicator according to claim 10, wherein the third sacrificial member comprises a threaded coupling simulating couplings between members of the piping.

12. The anticipatory failure indicator according to claim 8, wherein the failure modes are selected from the group consisting of:
erosion,
pressure shock resistance,
spot corrosion, and
crevice corrosion.

13. The anticipatory failure indicator according to claim 1, wherein the piping comprises cooling piping of a frequency converter.

14. A fluid cooling arrangement comprising:
a piping for circulating fluid coolant and having a resistance against strain caused by the circulated fluid coolant, and
an anticipatory failure indicator arranged in fluid connection with the piping for anticipating a failure caused by the circulated fluid coolant to the piping,
wherein the anticipatory failure indicator comprises an indicator according to claim 1.

15. The anticipatory failure indicator according to claim 1, comprising:
wherein the first sacrificial member is configured to be weaker than the piping in respect to a first failure mode, and
wherein the indicator comprises a third sacrificial member configured to be in direct contact with the fluid within the piping and isolating the fluid from the chamber, and to be weaker than the piping in respect to a third failure mode, which is different than the first failure mode.

16. The anticipatory failure indicator according to claim 15, wherein the third sacrificial member comprises a threaded coupling simulating couplings between members of the piping.

17. The anticipatory failure indicator according to claim 15, wherein the failure modes are selected from the group consisting of:
erosion,
pressure shock resistance,
spot corrosion, and
crevice corrosion.

18. The anticipatory failure indicator according to claim 10, wherein the failure modes are selected from the group consisting of:
erosion,
pressure shock resistance,
spot corrosion, and
crevice corrosion.

19. A fluid cooling arrangement comprising:
a piping for circulating fluid coolant and having a resistance against strain caused by the circulated fluid coolant, and
an anticipatory failure indicator arranged in fluid connection with the piping for anticipating a failure caused by the circulated fluid coolant to the piping,
wherein the anticipatory failure indicator comprises an indicator according to claim 10.

20. A fluid cooling arrangement comprising:
a piping for circulating fluid coolant and having a resistance against strain caused by the circulated fluid coolant, and
an anticipatory failure indicator arranged in fluid connection with the piping for anticipating a failure caused by the circulated fluid coolant to the piping,
wherein the anticipatory failure indicator comprises an indicator according to claim 1.

* * * * *